United States Patent [19]

Baum et al.

[11] 3,841,444
[45] Oct. 15, 1974

[54] DISC BRAKE WITH ANTI-RATTLE SPRING HOLD DOWN MEANS

[75] Inventors: Heinz Baum, Dudweiler; Eckart Op Den Camp, Saarbrucken; Gert Schrader, Kutzberg; John Redvers Botteril, Saarbrucken, all of Germany

[73] Assignee: Deutsche Bendix Ausrustungs GmbH

[22] Filed: May 14, 1973

[21] Appl. No.: 360,293

[30] Foreign Application Priority Data

| | | |
|---|---|---|
| May 12, 1972 | Germany | 2223206 |
| Oct. 25, 1972 | Germany | 2252156 |
| Jan. 25, 1973 | Germany | 2303448 |
| Mar. 17, 1973 | Germany | 2313346 |

[52] U.S. Cl. .............................. 188/72.3, 188/73.5
[51] Int. Cl. .......................................... F16d 55/22
[58] Field of Search ........ 188/73.5, 72.3, 71.8, 216, 188/205 A

[56] References Cited
UNITED STATES PATENTS

| | | | |
|---|---|---|---|
| 3,294,205 | 12/1966 | Schanz | 188/205 A X |
| 3,566,996 | 3/1971 | Crossman | 188/71.8 X |
| 3,710,896 | 1/1973 | Machek | 188/73.5 |

FOREIGN PATENTS OR APPLICATIONS

| | | | |
|---|---|---|---|
| 1,219,778 | 1/1971 | Great Britain | 188/72.3 |

*Primary Examiner*—George E. A. Halvosa
*Attorney, Agent, or Firm*—Ken C. Decker; William N. Antonis

[57] ABSTRACT

A disc brake with an anti-rattle spring for holding down two friction pads. The spring has at least one portion embracing a projection of the caliper of the brake for axially securing the spring to the caliper, and two resilient portions resting against at least one retaining pin and against the two upper sides of the pads to radially and axially preload the pads. The spring is made of a wire which is capital-omega or double-capital-omega shaped.

8 Claims, 9 Drawing Figures

PATENTED OCT 15 1974

DISC BRAKE WITH ANTI-RATTLE SPRING HOLD DOWN MEANS

The invention relates to a disc brake with a radially open caliper and with an anti-rattle spring made of wire for holding down two pads, said spring resting against the upper sides of the pads with respect to the brake and against at least one retaining pin held in the caliper for retaining the two pads.

This kind of brake is often subjected to shocks and vibrations leading to undesirable rattle movements of the pads and causing excessive wear of the linings of the pads. Consequently measures are taken to avoid said rattle movements. Furthermore after brake action a certain return movement of the pads is desirable. By this return movement excessive wear due to disc run out while the brake is not actuated is avoided.

The object of the present invention is to provide a disc brake with an anti-rattle spring which avoids the above mentioned disadvantages.

To this effect, the present invention provides a disc brake of the above type, wherein the spring is secured against axial movement with respect to the caliper by at least one portion of the spring and rests against the retaining pin and against the two upper sides of the pads respectively by means of two radially and axially resilient portions providing a pre-load to the pads and being frictionally engaged with them. The portion of hindrance spring connecting the spring to the caliper is preferably U-shaped and embraces a projection of the caliper which acts as a limit stop for the backing plates of the According to a preferred embodiment of the invention, the axial displacement of the resilient portions is predetermined by the smaller distance between said resilient portions.

According to an other embodiment of the invention, in the space between the backing plates and the projection of the caliper, the spring is provided with formed flats enlarging the wire breadth in an axial direction.

According to still another embodiment of the invention, the U-shaped portion connecting the spring to the caliper comprises a cross piece which is hinged to a first arm of a two-armed lever extending coplanar with the disc and radially preloading the spring in that the lever rests held against the caliper by its second arm and using the retaining pin as a support.

With the disc brake of the present invention, the intended effects, i.e., radial and axial spring load on the brake pads, are obtained cheaply by simple means. Close tolerance requirements are avoided and the braking force requirements remain approximately the same over all phases of wearing of the linings. The use of the invention on current disc brakes does not involve major modification; only a central position of the spring must be assured. This can be achieved in the way shown on the accompanying drawings, or by bolting, or other known fixing means. Any axial movement of the retaining pins will have no influence on the effectiveness of the spring.

The invention will now be described with reference to the accompanying drawings in which.

Figure 1:
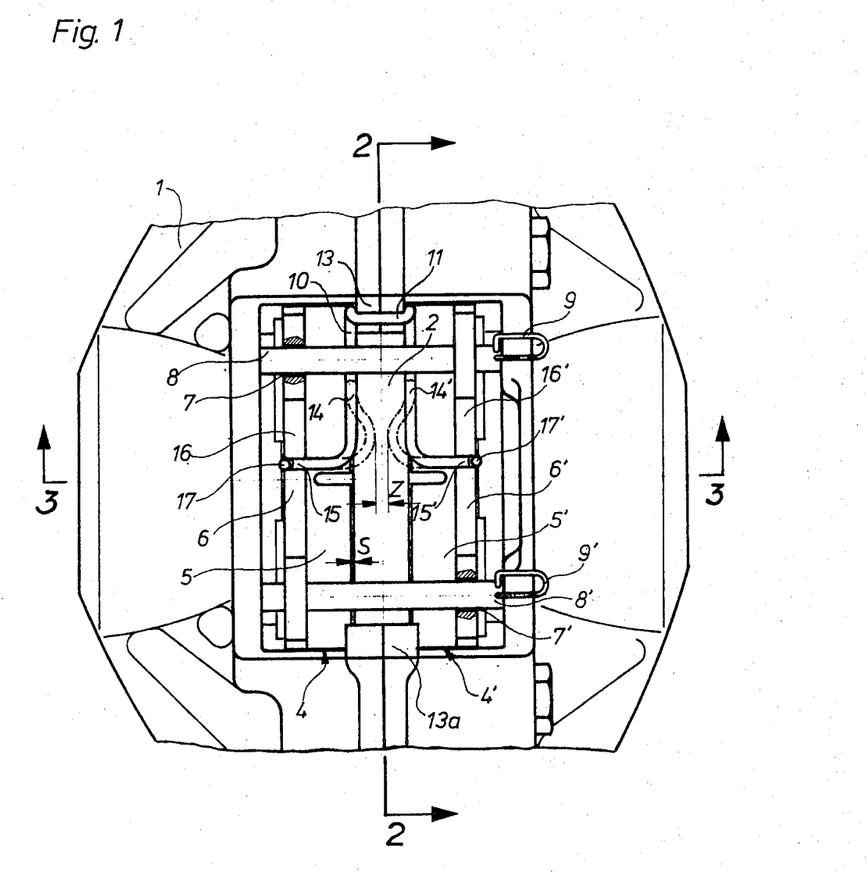
FIG. 1 shows a disc brake assembly embodying the invention.
Figure 2:
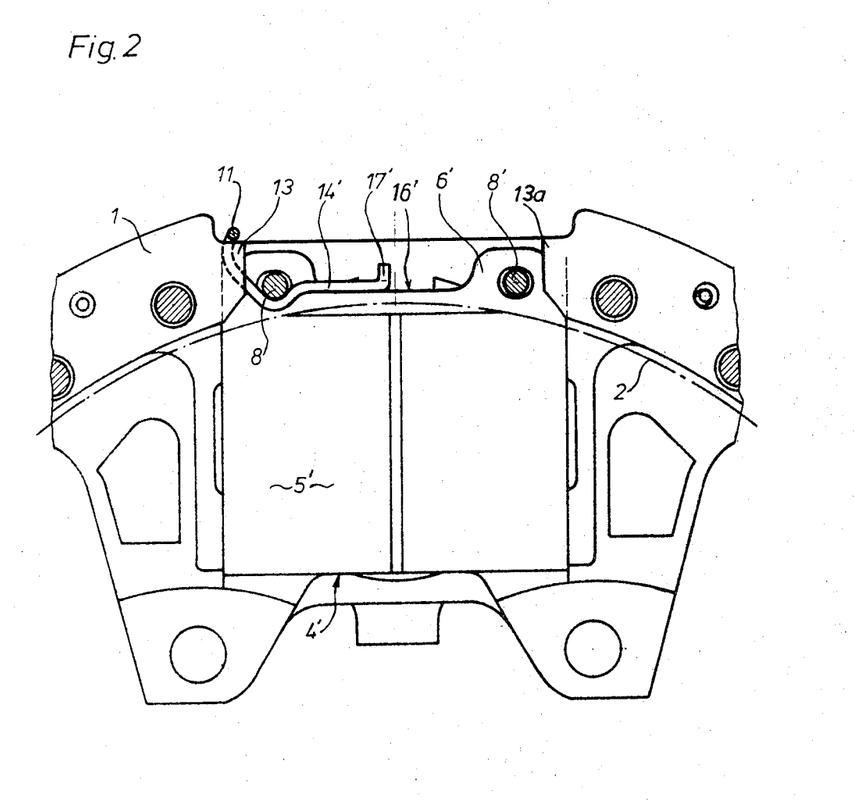
FIG. 2 is a sectional view taken along line 2—2 of FIG. 1.
Figure 3:
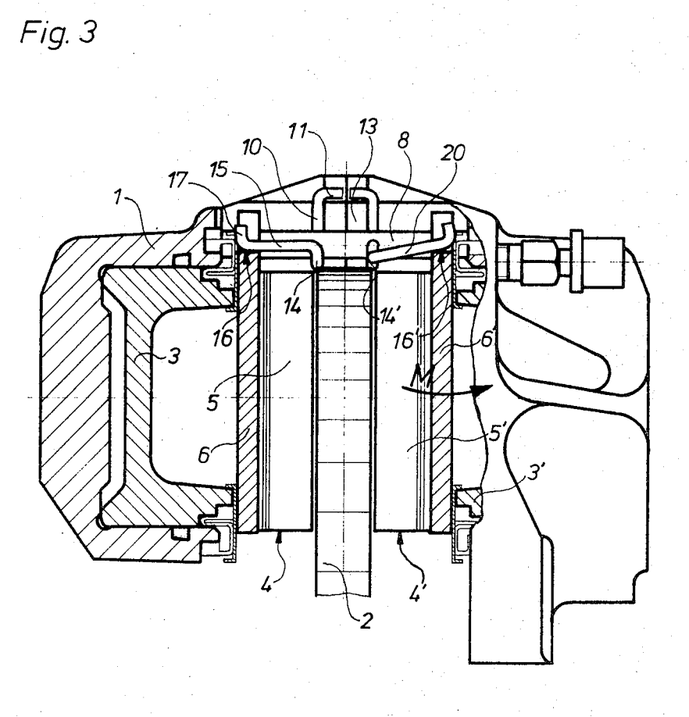
FIG. 3 is a sectional view taken along line 3—3 of FIG. 1.

In the embodiment of the invention shown in FIGS. 1 to 3, the disc brake is of the fixed-caliper type, wherein a disc 2 is partially straddled by a caliper 1 consisting of two opposite caliper halves each housing a piston 3 and 3'. Between the disc 2 and the pistons 3 and 3' pads 4 and 4' are inserted via the open top of the caliper 1. Said pads 4 and 4' consist of the linings 5 and 5' and the backing plates 6 and 6'. The backing plates 6 and 6' have bores 7 and 7' parallel to the axis of the pistons, through which the retaining pins 8 and 8' are led. These pins 8 and 8' having a certain clearance with respect to the bores 7 and 7', are held in bores of the caliper, and secured against axial movement by clips 9 and 9'. The brake pad units 4 and 4' are held down by a spring 10.

As shown in FIGS. 1 and 3, the spring 10 is capital-omega shaped and so formed that it locks with a U-shaped central portion 11 on a projection 13 of the caliper 1 and thus is secured against axial displacement and radial movement downwards with respect to the brake. The projection 13 of the caliper and another projection 13' on the opposite side of the caliper act as limit stops for the travel of the backing plates 4 and 4' when the brake linings 5 and 5' are worn. From the U-shaped central portion 11 two resilient portions 14 and 14' are led underneath the retaining pin 8 with respect to the brake and substantially co-planar with the disc approximately up to the central portion of the pads 4 and 4' where a pre-determined space is left between both portions 14 and 14'. In this area the spring 10 is bent approximately at a right angle with respect to the faces of the disc 1, and continues with axial portions 15 and 15'. Said portions 15 and 15' exert a load on the upper sides 16 and 16' of the backing plates 6 and 6' with which they are frictionally engaged. In order to avoid dammages of the boots which are normally used for protecting the brake pistons 3 and 3', the ends 17 and 17' of the portions 15 and 15' are bent upwards with respect to the brake. In the arrangement shown, the spring 10 is given a radial pre-load assured by the spring 10 resting against the projection 13, the retaining pin 8, and the backing plates 6 and 6' as shown in FIG. 2.

On the right section of FIG. 3, a modified spring is shown; in this case an oblique portion 20 instead of the approximately axial portion 15 exerts the spring load on the upper side 16' of the backing plate 6'. Thus a torque M against the brake pad 4' is created, in addition to the axial and radial pre-load by which said pad 4' is tipped away from the disc 2 against the piston 3'.

The actuation of the disc brake of FIGS. 1 to 3 will be now described:

When the brake system is actuated, the space S between disc 2 and the linings 5 and 5' is reduced to zero and the desired friction contact is established. Also during brake operation the upper sides 16 and 16' remain frictionally connected to the portions 15 and 15' of the spring 10; thus an axial pre-load is created by the portions 14 and 14' and 15 and 15' respectively which are forced towards each other. On brake release the pistons 3 and 3' retract in the usual way. The axially and radially preloaded spring 10' is allowed then to push the brake pads 4 and 4' apart again, as can be seen from FIG. 1. and FIG. 3. With progressing wear of the linings 5 and 5' the axial pre-load is increased to such an extent that the friction between the spring portions 15 and 15' and the backing plates 6 and 6' is overcome. The portions 15 and 15' then slide on the upper sides 16 and 16' of the backing plates 6 and 6'. However, before sliding starts a certain axial pre-load is still built up to ensure the return of the pads. This axial pre-load can be controlled by establishing the spring constant especially of the portions 14 and 14'; as well as by suitably dimensioning the space between the two portions 14, 15 and 14', 15' respectively. If said space is, with respect to the special shape of the spring, assumed to be equal to Z as shown dotted on FIG. 1, the maximum spring travel per pad is equal to z/2, i.e. the maximum return travel of the pad is also equal to z/2. Taking into account the prevailing friction conditions by establishing Z the return travel can be pre-determined to a certain extent. For this purpose the prevailing friction conditions must be considered or modified. In particular it must be ensured that the axial friction resistance between the spring 10 and the pads 4 and 4' is greater than that between the retaining pins 8 and 8' and the pads 4 and 4'. This can be obtained by increasing the friction resistance of the spring 10 by material deformation on its surfaces contacting the backing plates 6 and 6', e.g., knurls or the like. The same effect can be obtained by choice of different material pairings for spring portion and backing plates; in particular the spring 10 can be coated, at least on its surfaces contacting the backing plates 6 and 6' with material as for instance rubber, plastic or the like, to increase the frictional resistance.

Figure 4:
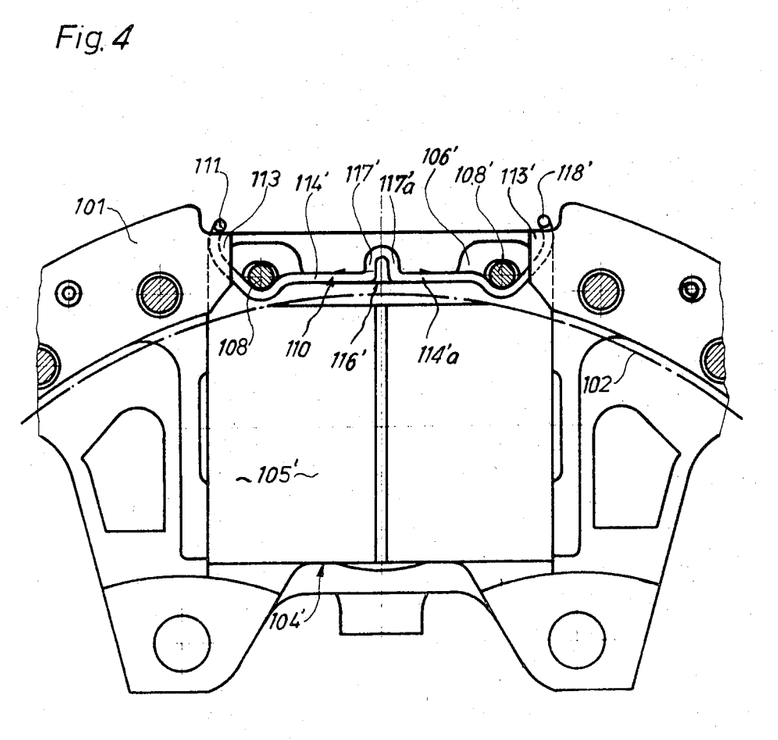
FIG. 4 is a sectional view of another embodiment of the invention.

In the embodiment of the invention shown in FIG. 4, the references relating to similar parts are increased of 100 with respect to the embodiment shown in FIGS. 1 to 3.

The disc brake is of the same type that the brake shown in FIGS. 1 to 3, but the spring 110 is double capital-omega shaped and provided with two U-shaped portions 111 and 118 embracing two projections 113 and 113' respectively of the caliper 101. The spring 110 is thus secured against axial displacement and radial movement downwards with respect to the brake. The projections 113 and 113' act as limit stops for the travel of the backing plates when the pads are worn. With thus design of the spring 110, the projections 113 and 113' are identical without to use a second spring as spring 10 in the preceding embodiment. The forming of the spring is facilitated by interrupting one of the U-shaped portions 111 or 118. The operation of the brake is the same as the one of the brake described in the embodiment shown in FIGS. 1 to 3.

Figure 5:
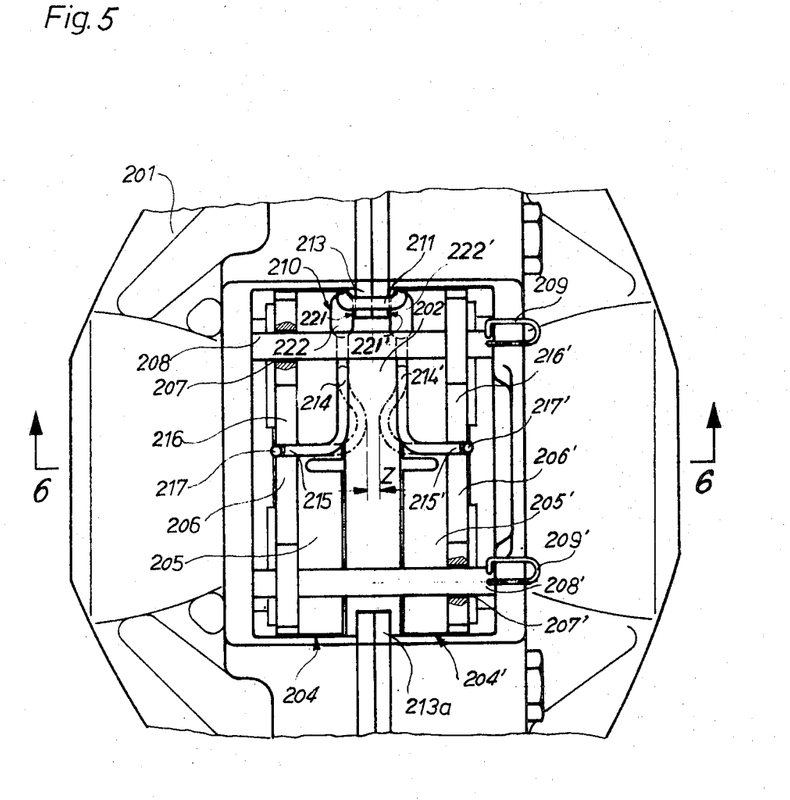
FIG. 5 shows a disc brake assembly according to still another embodiment of the invention.
Figure 6:
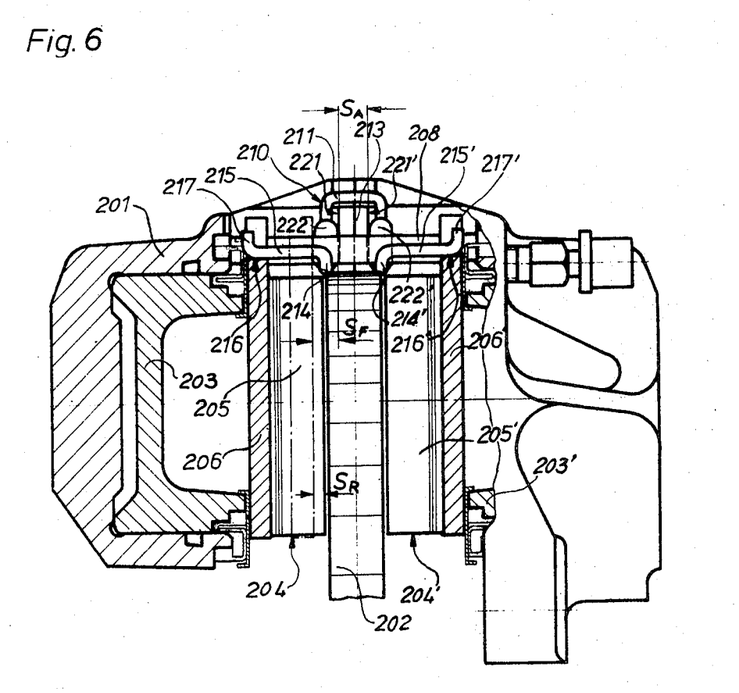
FIG. 6 is a sectional view taken along line 6—6 of FIG. 5.

In FIGS. 5 and 6, it is shown another embodiment of the invention wherein the references are increased of 200 with respect to those used to define similar parts in the embodiment shown in FIGS. 1 to 3.

The disc brake is of the same type as in the preceding embodiments, with a spring 210 which is capital-omega shaped as in the embodiment shown in FIGS. 1 to 3.

As it can be seen in FIGS. 5 and 6, the round wire of the spring 210 is flattened between the backing plates 206 and 206' and the stop surfaces 221 and 221' of the projection 213. The formed flats 222 and 222' extent in axial direction and broaden the fixed limit stop for the backing plates 206 and 206', when the brake linings 205 and 205' are worn. In FIG. 6 the position of the backing plate 206 is indicated by dot-dash-lines, when the lining 205 is worn. One can see that the thickness SR of the worn lining 205 is pre-determinable by the thickness SF of the spring-flats 222 in combination to the thickness SA of the projection 213.

With this embodiment, further mounting and dismounting of the pads is facilitated, because by the broadening of the limit stop width by the spring, the thickness of the caliper projection can be held smaller than the thickness of the brake disc. Therefore, the whole axial space between piston and brake disc can be utilized for the thickness of the brake linings. Dismounting of the worn pads can be made directly in a radial direction without hnidrance from the projection after the retaining pins and the spring are detached.

Figure 7:
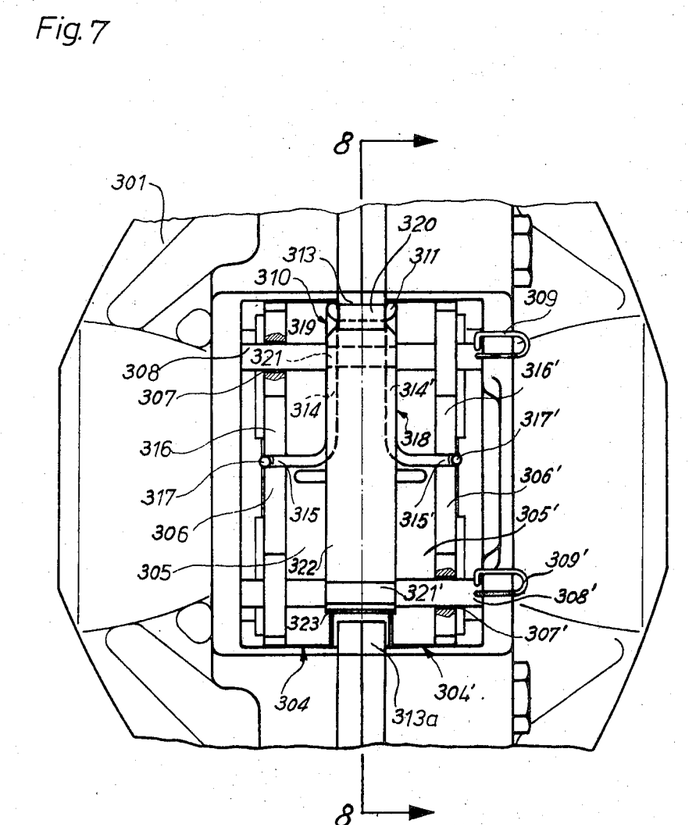
FIG. 7 shows a disc brake assembly according to still another embodiment of the invention.
Figure 8:
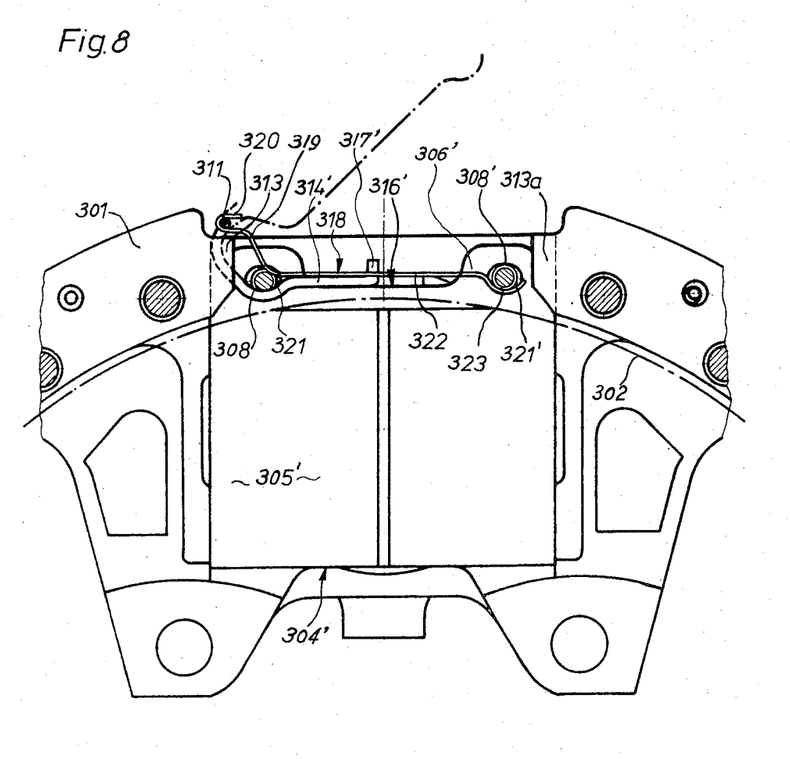
FIG. 8 is a sectional view taken along line 8—8 of FIG. 7.
Figure 9:
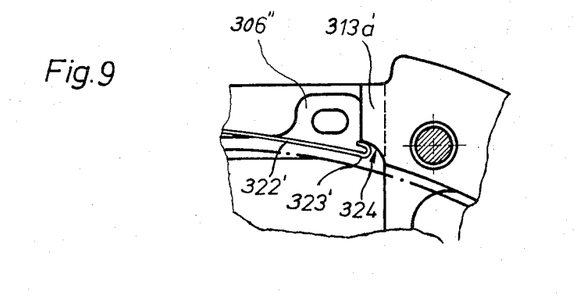
FIG. 9 is a partial section of another embodiment of the lever of FIG. 8.

The embodiment of the invention illustrated in FIGS. 7 to 9 shows a disc brake of the same type and which includes the same spring as in the first embodiment shown in FIGS. 1 to 3. The references are increased of 300 with respect to those of the first embodiment.

As it is shown in FIGS. 7 and 8, the spring 310 is radially pre-loaded by a lever 318. The position of the two-armed lever 318 before fitting of the retaining pin 308' is shown dotted on FIG. 8. Te lever 318 is made from spring plate and its breadth is approximately equal to the breadth of the spring 310, i.e., thickness of the disc 302 plus thickness of the worn linings of the pads 304 and 304'. The first arm 319 of the lever 318 is shaped on its end to form a hook 320 in which the portion 311 of the spring 310 arrested above the projection 313. In the installed condition the arm 319 extends towards the retaining pin 308 and engages in a groove 321 of the retaining pin 308. Due to being locked via arm 319 and portion 311 of spring 310 the retaining pin 308 is precluded from axial movement, so that the clip 309 becomes unnecessary or acts as a second security device. The base of groove 321 of the retaining pin 308 acts as support for the lever 318. The lever 318 extends via second arm 322 from the retaining pin 308 to the retaining pin 308'. The disposition of the lever 318 between the retaining pins 308 and 308' is approximately parallel to the upper side of the brake pads 304 and 304' with respect to the brake and to the portions 314 and 314' of the spring 310. Underneath the retaining pin 308' the arm 322 is bent into a hook 323, resting approximately radially from below against the retaining pin 308'. The hook 323 engages the groove 321' of the retaining pin 308' and secures the retaining pin 308' against radial displacement.

FIG. 9 shows a modified support for the lever 318. This modification may be applied if the retaining pin 308' is to be separed. In this case the lever 322', e.g., slightly towards a U-shaps, so that the hook 323'

"snaps" under the projection 313a'. However, if the spring rate of the lever is too great, the lever arm 322' may be led side-wards between the backing plates 306' and the projection 313a' and set against the lower side of the projection 313a' with respect to the brake.

Further to the above described ways of fixing the lever arm 322 or 322' said arm 322 and 322' can be bolted or similarly fixed; especially the projections 313 and 313a may be made as separate elements whereby the projection 313a' would be bolted on the caliper after pre-loading the lever 318.

The use of the lever 318 allows a further important advantage in the installation of the spring 310. The retaining pin 308 can be inserted in the caliper through the bores of the backing plates and through the spring without preload of said spring, and thus without hindrance. Only after fitting of the retaining pin 308, is the spring radially preloaded and fastened either directly or indirectly via the retaining pin 308' on the caliper. When the spring is fastened by the retaining pin 308', this pin is held rattle free by the lever. The length of the second lever arm 322 cases the fitting of the retaining pin 308' and the fixing of the lever in the caliper.

What we claim is:

1. In a brake: a rotor having a pair of friction faces, a pair of friction elements disposed adjacent said friction faces, a caliper straddling said rotor and engaging each of said friction elements, said caliper including means for urging each of said friction elements into braking engagement with a corresponding friction face when a brake application is effected, said caliper defining an aperture to permit insertion and removal of said friction elements, said caliper including a pair of pins extending through said friction elements for supporting the latter for movement toward and away from said rotor, said caliper having a projection extending into said aperture, and a generally U-shaped spring having a bridge portion and a pair of arms extending therefrom generally parallel to said friction faces, said bridge portion being supported by said projection, said arms terminating in axially extending portions engaging the edges of corresponding friction elements, said arms extending under one of said pins from the projection so that said arms are stressed to exert a force urging the friction elements in a direction parallel to said friction faces to prevent said friction elements from rattling.

2. The invention of claim 1, wherein the frictional forces between said pins and the friction elements, whereby movement of the friction elements toward the rotor when a brake application is effected stresses said arms so that upon release of the brake the arms urge the friction elements away from the rotor.

3. The invention of claim 1, wherein said axially extending portions also extend upwardly with respect to said brake at an angle with respect to said rotor.

4. The invention of claim 1, wherein the U-shaped spring is a bent wire, said bent wire having flats formed thereon extending axially with respect to the rotor.

5. In a brake: a rotor having a pair of friction faces; a pair of friction elements, one of said elements facing each of said friction faces; a caliper straddling said rotor and engaging each of said friction elements, said caliper including means for urging each of said friction elements into braking engagement with its corresponding friction face when a brake application is effected, said caliper defining an aperture to permit insertion and removal of said friction elements; said caliper including a pair of pins extending through said friction elements for supporting said elements for movement toward and away from the rotor; spring means including an axial portion and two resilient portions extending from each end of said axial portion, the free end of each resilient portion engaging the edge of one of said friction elements, each of said resilient portions comprising an intermediate portion engaging an inner surface of one of said pins; and preloading means comprising a lever having first and second arms, said first arm hinging on the axial portion of said spring means, said second arm extending from said first arm and engaging a portion of the caliper, said arms engaging one of said pins to thereby radially pre-load said spring means.

6. A disc brake as claimed in claim 5, wherein the second arm is held against a lower surface of the other pin.

7. A disc brake as claimed in claim 8, wherein the lever engages in a groove of said other pin.

8. In a brake: a rotor having a pair of friction faces; a pair of friction elements, one of said elements facing each of said friction faces; a caliper straddling said rotor and engaging each of said friction elements, said caliper including means for urging each of said friction elements into braking engagement with its corresponding friction face when a brake application is effected, said caliper defining an aperture to permit insertion and removal of said friction elements; said caliper including a pair of pins extending through said friction elements for supporting said elements for movement toward and away from said rotor; a projection on said caliper extending into said aperture; spring means including a U-shaped portion embracing said projection on the caliper; said U-shaped portion including two resilient portions, each of said resilient portions engaging the edge of a corresponding friction element and one of said pins; said resilient portions thereby preloading the friction elements; and a lever comprising a first arm hinging on a portion of the U-shaped portion of the spring means, said lever resting against a portion of the caliper and having a second arm supported by one of said pins, thereby radially preloading the spring means.

* * * * *